March 17, 1931.  E. M. JENSEN  1,797,149

SOUND HEAD FOR MOTION PICTURE PROJECTORS

Filed March 3, 1930  2 Sheets-Sheet 1

INVENTOR
Edward M. Jensen
BY
Fred C. Matheny
ATTORNEY

March 17, 1931.  E. M. JENSEN  1,797,149

SOUND HEAD FOR MOTION PICTURE PROJECTORS

Filed March 3, 1930  2 Sheets-Sheet 2

INVENTOR
Edward M. Jensen
BY
Fred C. Matheny
ATTORNEY

Patented Mar. 17, 1931

1,797,149

UNITED STATES PATENT OFFICE

EDWARD M. JENSEN, OF SEATTLE, WASHINGTON

SOUND HEAD FOR MOTION PICTURE PROJECTORS

Application filed March 3, 1930. Serial No. 432,610.

My invention relates to improvements in sound heads for use in connection with moving picture projectors and the object of my invention is to provide a sound head which is simple in construction and efficient in operation and which may readily be adapted for use in connection with various types of motion picture projectors now in common use.

Another object of the invention is to provide a novel and efficient arrangement of light controlling mechanism by which light is projected through the sound record of a motion picture film and caused to fall upon a photo-electric cell to vary the conductivity of said cell, said light controlling mechanism embodying a tubular light gate movable on an inclined trackway into and out of the path of the pencil of light which is passing through the sound record on the film.

Other and more specific objects are to provide mechanism of this nature embodying a light gate which is very quickly and easily moved into an operative or an inoperative position, and which will permit the film to be quickly and easily inserted or removed and which will further permit the surfaces over which the film passes to be readily cleaned when the light gate is lowered into the inoperative position.

Further objects will be apparent from the following description taken in connection with the accompanying drawings.

In the drawings Figure 1 is a somewhat diagrammatic side elevation of a motion picture projector which is equipped with a sound head constructed in accordance with my invention.

Like reference numerals designate like parts throughout the several views.

Figure 1:
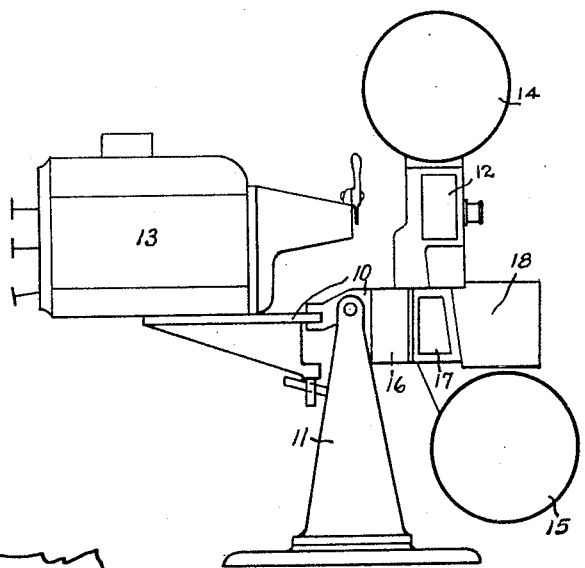

In Fig. 1, I show, somewhat diagrammatically, a motion picture projector embodying a frame 10 mounted on a pedestal 11 and carrying a picture projector housing 12, a source of light housing 13 and housings 14 and 15 for the reception of the film rolls.

In accordance with my invention I provide what I term a sound head for attachment to the parts hereinbefore mentioned. This sound head preferably comprises three compartments indicated generally at 16, 17, and 18 in Figs. 2 and 3. The doors of the compartments 16 and 17 are preferably on the side and are shown closed in Fig. 1. The compartment 16 is a lamp compartment in which one or more lamps 20 are mounted. The lamp or lamps 20 are for the purpose of furnishing light for projection through the sound record of a motion picture film as hereinafter set forth. The compartment 18 has a photo-electric cell 21 mounted therein and also affords room for certain amplifying mechanism, not shown. The compartment 17 is located between the compartments 16 and 18 and contains the apparatus to which this invention pertains.

Mounted within the compartment 17 are three rollers 22, 23, and 24 over which a motion picture film, indicated by dotted lines 25, passes. This film 25 also carries a sound record of the usual form disposed alongside of the picture record. The roller 23 is preferably a driven sprocket roller and serves as a means for moving the film at a constant speed. The compartment 17 is preferably located below the picture projector housing 12 and the film passes from the housing 12 downwardly into the housing 17 thence over the rollers 22, 23, and 24 and thence downwardly to a reel in the film housing 15.

Between the rollers 22 and 23 is a film shoe 26 which is secured to an outwardly projecting flange 27 on a lens tube bracket 28. The lens tube bracket 28 is secured as by screws 30 to the back wall of the housing 17 and has a bifurcated tubular portion 31 within which a lens tube 32 is clamped and securely held in a horizontal position. One end of the lens tube 32 projects into the light compartment 16 and is positioned to receive light from the lamp 20, and the other end of said lens tube is directed toward the film shoe 26. The film shoe 26 is provided, in alignment with the axis of the lens tube 32, with a hole or aperture 33 through which a beam of light may pass, the walls of said hole 33 preferably being tapered, as shown, and the hole preferably being of substantially the same width as the sound record of the film, and being positioned to exactly register with said sound record on the film as the film passes downwardly over the front side of the film shoe.

Figure 3:
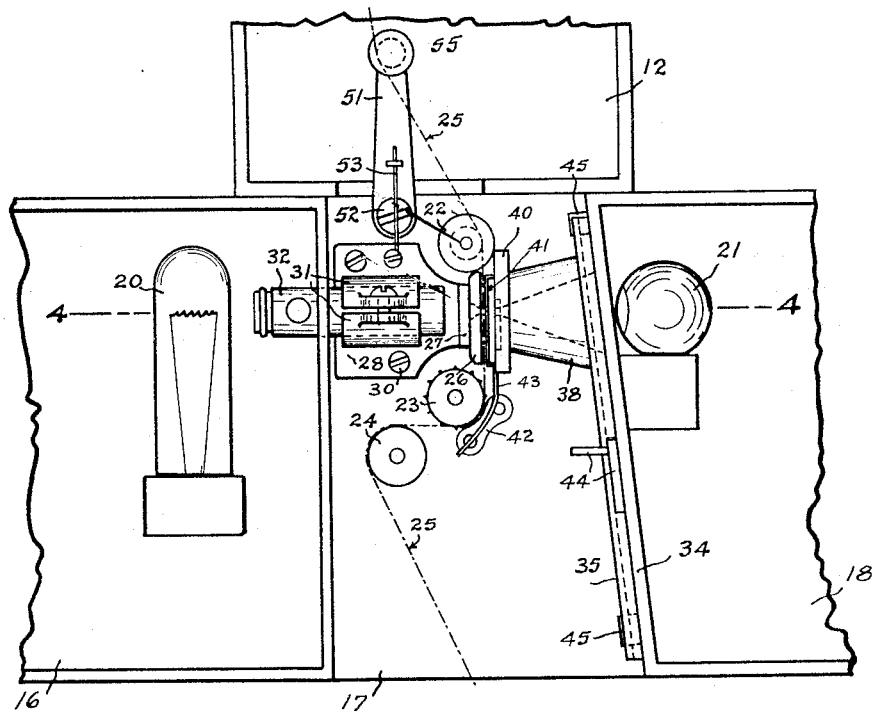
Fig. 3 is a view similar to Fig. 2 except that the light gate is shown in a raised position and the light gate and other parts are shown in cross section.
Figure 4:
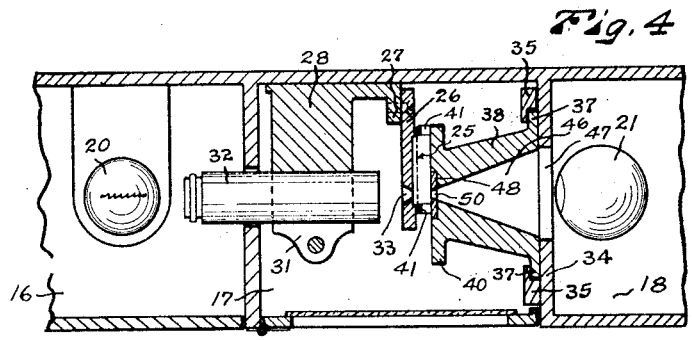
Figure 4, is a fragmentary sectional view substantially on broken line 4—4 of Figure 3.

For the purpose of directing a pencil of light which has passed through the hole 33 in the film shoe and through the sound record of the film onto the photo-electric cell it is necessary to provide a light gate. Various types of light gates have been devised but, so far as I know, none of these light gates have heretofore been made movable away from the film shoe to allow a quick and easy threading of the film onto the rollers and to allow free and easy access to the end of the light gate and to the film shoe for the purpose of cleaning the portions over which the film passes, which portions quickly become fouled and require cleaning. In accordance with my invention I provide a light gate which may be quickly and easily moved away from the film shoe in a general sidewise direction, without interfering with any of the other mechanism, said light gate having a restricted aperture through which light may pass to the photo-electric cell, and being out of the way and easily accessible for cleaning when in an inoperative position. As a mounting for my light gate I provide at the front of the chamber 17 an inclined wall 34 having two spaced apart parallel track members 35 secured thereto, said track members 35 each being so shaped as to afford trackways for slidably receiving the base 37 of a light gate member 38. The light gate 38 has a flange 40 on its rear end which is arranged to be positioned directly in front of the film shoe when said light gate is in the raised or operative position as shown in Fig. 3. Two guide members 41 are provided in spaced apart relation on the end of the light gate to engage with and guide said film, another guide member 42 is suspended from the front end of the light gate by means 43 preferably including a resilient member. This guide 42 engages the film at the location of the sprocket roller 23 when the light gate is raised and guides said film and holds it in contact with said roller 23. The light gate is held in the raised position by a spring catch member 44 and is released for lowering by exerting suitable pressure with the finger on said catch member. Stop members 45, preferably of rubber, are provided to limit the downward movement and the upward movement of the light gate. The inclination of the trackways causes the light gate to be moved away from the film shoe as it is lowered and to be moved toward said film shoe as it is raised. The light gate 38 has an expanding or bell shaped passageway 46 extending longitudinally therethrough, the smaller end of said passageway being in alignment with the hole 33 in the film shoe 26 and the larger end of said passageway registering with an opening 47 in the housing wall 34 directly opposite the photo-electric cell. An aperture plate 48 having an aperture 50 of exactly the desired size and shape is preferably secured to the inner end of the light gate 38.

A film tightener in the nature of a roller 55 on an arm 51 which is pivoted on a screw 52 and resiliently supported by a spring 53 is provided to take up the slack between the guide roller 22 and certain rollers 54 in the picture projector housing 12 said housing 12 being located above the sound head apparatus.

Figure 2:
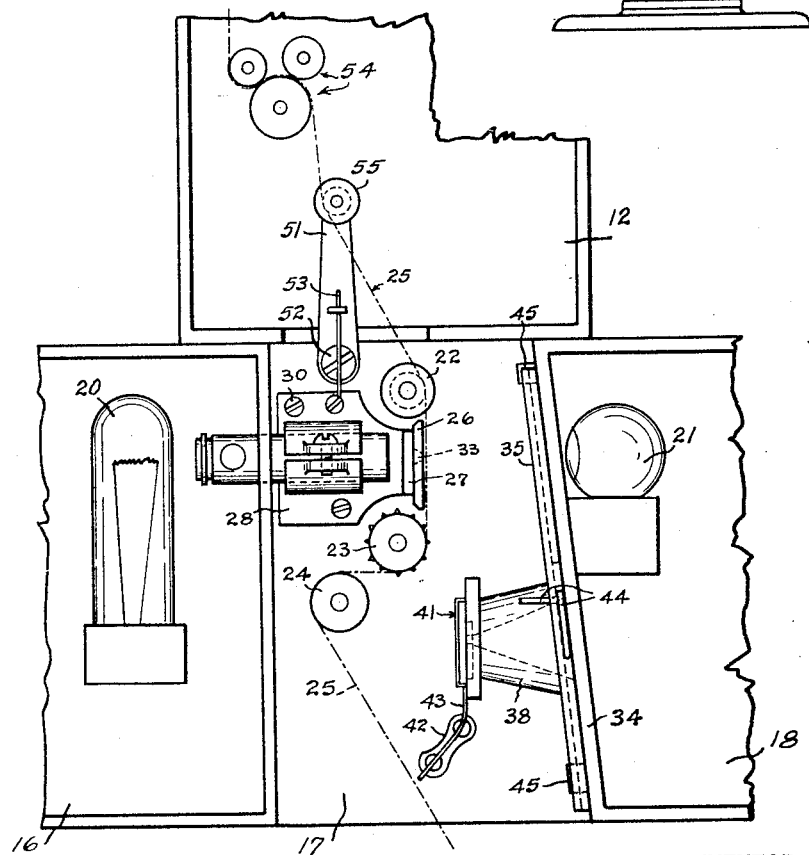
Fig. 2 is a fragmentary elevation, on a larger scale, and with the doors removed, of the light controlling mechanism within the sound head, the light gate being shown in a lowered or inoperative position.

When the light gate is in the lowered position, shown in Fig. 2, the film 25 may be quickly and easily inserted or removed or adjusted to a different position and the film shoe and end of the light gate are readily accessible for cleaning. When the light gate is raised into the position shown in Fig. 3, it will be firmly and rigidly held and will be correctly aligned with the lens tube 32 and the photoelectric cell 21 whereby a beam of light of the desired size and intensity passing through the aperture plate 48 will fall upon the photoelectric cell 21.

The light gate, when in the raised position, also cooperates in guiding and supporting the film where said film passes between it and the film shoe 26.

The foregoing description and accompanying drawings clearly disclose a preferred embodiment of my invention but it will be understood that this disclosure is merely illustrative and that such changes in the invention may be made as are within the scope and spirit of the following claims.

I claim:—

1. In a sound head for a motion picture projector, the combination with film shoe means over which a film passes, of a light gate slidable in an inclined direction from a position in front of said film shoe means into a position out of alignment with said film shoe means to occupy a plane offset from the normal plane thereof, and means supporting said light gate for movement.

2. In a sound head for a motion picture projector, the combination with film shoe means over which a film having a sound record thereon passes, of a light gate movable from a position directly in front of said film shoe into a position out of alignment with said film shoe, and inclined track means supporting said light gate for movement relative to said film shoe, the inclination of said trackway causing said light gate to be moved close to said film shoe as it is moved into alignment therewith and to be moved axially away from said film shoe as it is moved out of alignment therewith.

3. In a sound head for a motion picture projector, the combination with film shoe means over which a sound record film moves in a substantially vertical direction, of devices for projecting a pencil of light through said film shoe means, a light gate movable into and out of alignment with said film shoe means and arranged to have the film pass between it and said film shoe means and upright track means inclined relative to the direction of movement of the film and supporting said light gate for simultaneous movement transversely of said pencil of light and toward and away from said film.

4. In a sound head of the class described, a lens tube, a photo-electric cell supported in alignment with said lens tube, a film movable between said cell and said lens tube, and a light gate slidably mounted for transverse movement relative to the axis of said lens tube into and out of alignment with said lens tube and into a vertical plane offset from its normal position between said film and said photo-electric cell and having a light aperture through which light which passes through said lens tube and said film may travel to reach said photo-electric cell.

5. In a sound head of the class described, a lens tube, a photo-electric cell disposed in alignment with said lens tube, a sound record film movable between said lens tube and said cell, roller means supporting said film for movement, a tubular light gate movable into and out of alignment with said lens tube between said film and said photo electric cell, track means supporting said light gate and film guide means carried by said light gate.

6. A sound head for a motion picture projector embodying a housing having a lamp compartment, an amplifier compartment and a film compartment, a lens tube mounted in said film compartment and extending into said lamp compartment, illuminating means in said lamp compartment, a photo-electric cell in said amplifier compartment in alignment with said lens tube, a film movable between the end of said lens tube and said cell, and a light gate slidably mounted for transverse movement relative to the axis of said lens tube into and out of alignment with said lens tube between said film and said photo-electric cell.

7. In a sound head for a motion picture projector, a housing having an inclined front wall, a lens tube bracket in said housing, a lens tube supported in a horizontal position in said bracket, a substantially vertical film shoe disposed crosswise of the end of said lens tube and having a light aperture therein in alignment with said lens tube, a film movable vertically across said film shoe and having a sound record in alignment with said light aperture, a light gate having a tubular passageway and having an aperture at one end of said passageway in alignment with the sound record on said film, track means on said inclined front housing wall for supporting said light gate for movement into and out of alignment with said lens tube, film guide means carried by said light gate and releasable means for holding said light gate in elevated position.

8. In a sound head for a motion picture projector, a housing having an inclined front wall provided with an opening, a photo electric cell in alignment with said opening on the outer side of said wall, a lens tube supported in a horizontal position in said housing, means for projecting a light through said lens tube, a film shoe extending crosswise at the end of said lens tube and having a light aperture therein in alignment with said lens tube, a film movable vertically across said film shoe and having a sound record in alignment with said light aperture, a light gate having a tubular passageway and having an aperture at one end of said passageway in alignment with the sound record on said film, track means on said inclined front housing wall for supporting said light gate for movement into and out of alignment with said lens tube, film guide means carried by said light gate and a releasable catch member for holding said light gate in elevated position.

The foregoing specification signed at Seattle, Wash., this 21st day of Feb. 1930.

EDWARD M. JENSEN.